May 29, 1951  R. M. PETTITT  2,554,719
ENDLESS CHAIN MULCHER
Filed May 9, 1947  2 Sheets-Sheet 1
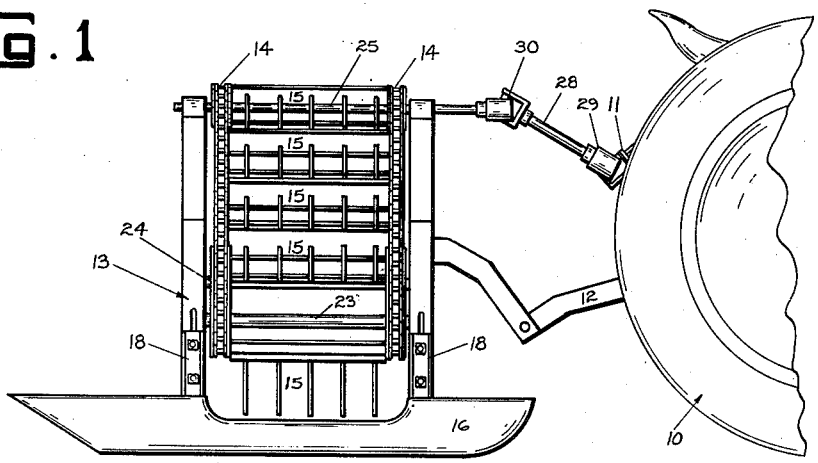
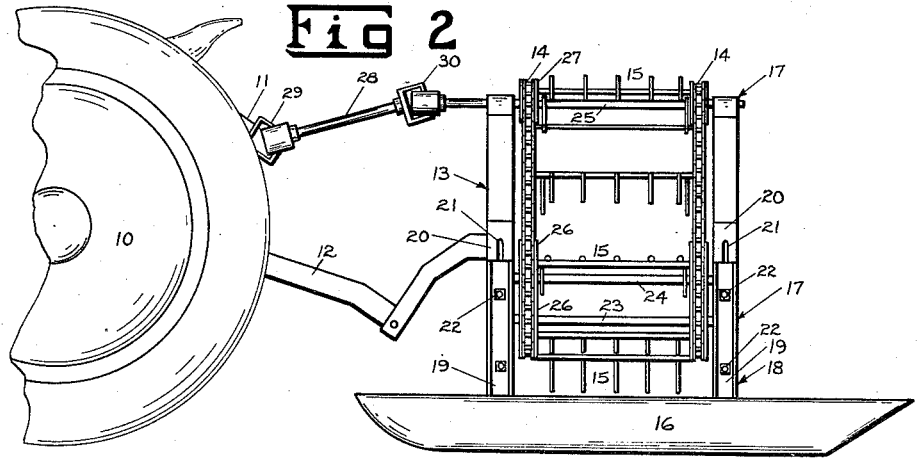
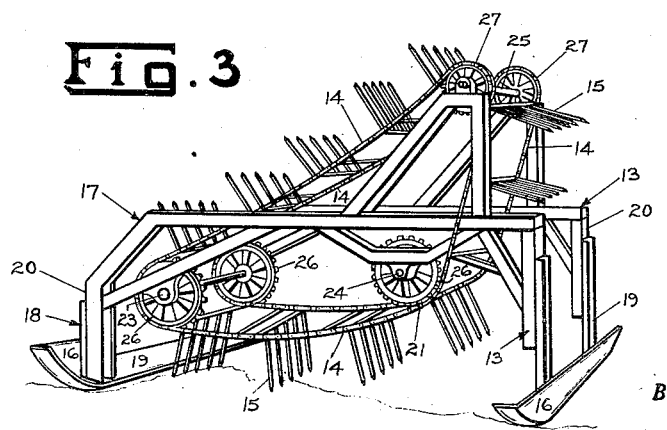
INVENTOR:-
ROBERT M. PETTITT
BY
Huebner, Maltby & Beehler
ATTORNEYS May 29, 1951    R. M. PETTITT    2,554,719
ENDLESS CHAIN MULCHER
Filed May 9, 1947    2 Sheets-Sheet 2

INVENTOR:-
ROBERT M. PETTITT
BY
ATTORNEYS

Patented May 29, 1951

2,554,719

UNITED STATES PATENT OFFICE 2,554,719

ENDLESS CHAIN MULCHER

Robert Max Pettitt, Fresno, Calif.

Application May 9, 1947, Serial No. 746,899

4 Claims. (Cl. 97—46)

The present invention relates to agricultural implements and has particular reference to a harrow adapted to comb debris from the soil.

A seasonable task in perennial row crops, such as vineyards and the like, is the plowing of the earth and weeds from between the plants in the row and discharging said earth and weeds in a ridge adjacent the row. Not only is the soil and weeds thus removed, but other debris, such as prunings, leaves and other trash that provide shelter for insects are removed from between the plants and discharged between the rows of plants. Subsequently the soil so discharged is returned to avoid leaving low places in the row conducive to the collection of water and to resultant rapid weed growth. Generally, areas in which perennial row crops are commercially grown, the climate and soil conditions are such as to stimulate the rapid growth of tenacious weeds, such as Bermuda grass, Johnson grass and the like. These weeds have the ability to grow from cuttings and thus when such weeds are returned with the soil, it is but a short time until the weeds are firmly re-established. It thus has become the practice to attempt to work debris from the soil before it is returned to the rows of plants and thus to obviate the immediate recurrence of weed growth therein.

The present invention thus has for an objective the combing of debris from the soil and the depositing of the same in a position where it may readily be destroyed.

Another object is to provide a harrow adapted to cultivate the soil with a combing action lateral to the direction of movement of the harrow.

Another object is to provide a harrow adapted to comb debris from the soil adjacent row crops and to deposit such debris between rows of said crops.

Another object is to provide a power driven cultivator exercising a cultivating effect on the earth traversed lateral to the direction of movement of the cultivator.

Another object is to provide a novel endless support means for earth working tools and means for supporting the same in circuitous travel in a draft frame.

A further object is to provide a harrow of unique design having a novel and useful association and interrelationship of its parts.

Other objects and advantages will become apparent in the further description in the specifications.

In the drawings:

Fig. 1 is a side elevation of a harrow of the present invention associated with a draft appliance having a rotary power take-off.

Fig. 2 is a side elevation of the opposite side of the harrow seen in Fig. 1.

Fig. 3 is an isometric view of the harrow illustrated in Figs. 1 and 2.

Figure 4:
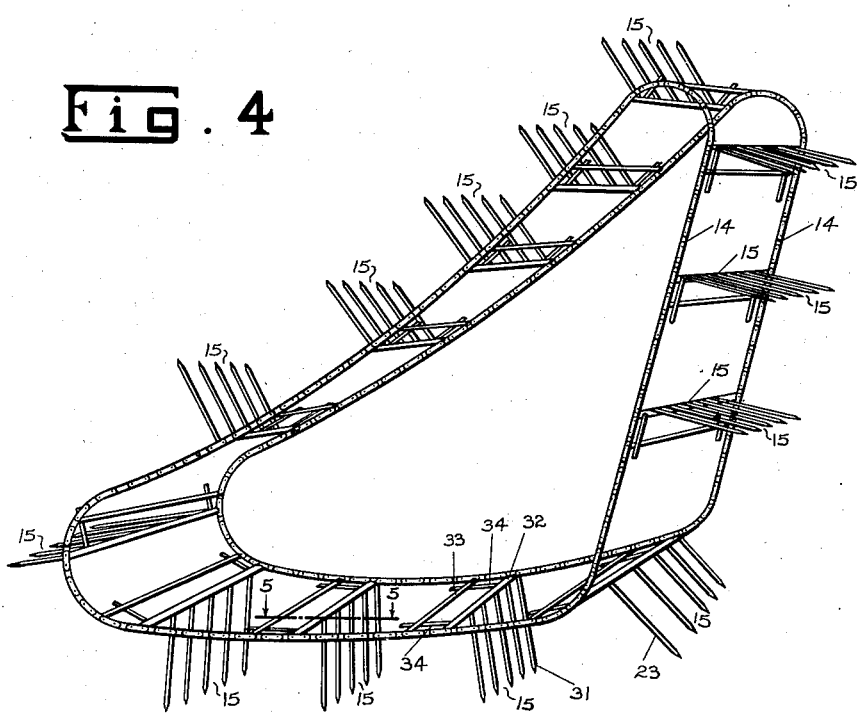
Fig. 4 is an enlargement of the earth working tools, mountings, and chains therefor disassociated from the remainder of the harrow structure, for clarity of illustration.
Figure 5:
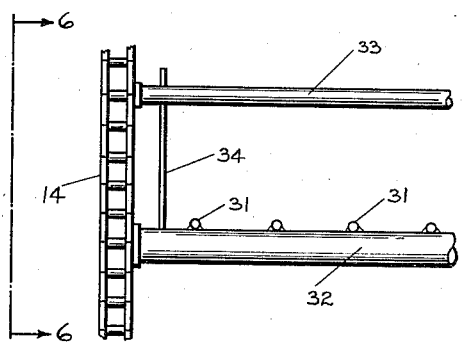
Fig. 5 is a fragmentary enlargement, taken on line 5—5 of Fig. 4.

Referring in greater detail to the drawings:

In Fig. 1 a draft appliance, such as a tractor, is generally indicated at 10, having a rotated shaft 11 rearwardly disposed, generally referred to as a power take-off. A tractor draw bar 12 is rearwardly extended from the tractor and the harrow of the present invention engaged thereto for operating purposes. These conventional elements are generally available in suitable draft appliances and do not comprise essential elements of the present invention.

Essentially the device of the present invention comprises a forwardly movable draft, or support frame 13, endless tool mounting means 14, circuitously traveled in the frame, and earth working tool assemblies 15 borne by the tool mounting means and motivated in cultivating action thereby.

The support frame 13 includes earth engaging members 16 which may take the form of skids, wheels or other supporting aids; a tool supporting section, indicated generally at 17; and telescopic supports 18 interconnecting the tool supporting section and the earth engaging means. The telescopic supports conveniently comprise elements 19 upwardly extended from the earth engaging means 16 and upper elements 20 bearing the tool supporting section and longitudinally slidably engaged with the elements extended from the earth engaging members. One of each of the associated elements is preferably provided with an elongated opening 21 through which bolts are extended and engaged with the other associated element. The bolts provide for the locking of the telescopic supports in adjusted lengths to predetermine elevation and inclination of the tool supporting section relative to earth traversed by the harrow. This elevational control of the tool support section provides depth control of the earth working tools, as soon will become apparent, and tilt adjustment in response to cultivating problems encountered.

A plurality of shafts are journaled in the tool supporting section 17 of the frame 13 substantially parallel to the normal direction of movement of the harrow. One such shaft 23 is preferably positioned near a side of the frame in spaced relation to earth traversed. A second of said shafts 24 is preferably provided inwardly from the first shaft and slightly higher than the first. A third shaft 25 is conveniently positioned opposite the second shaft from the first and generally above the second shaft. Idler sprockets 26 are mounted on the first and second shafts 23 and 24 respectively. Drive sprockets 27 are splined on the third, or highest, shaft 25. This arrangement of sprockets has been found convenient in that the drive sprockets may be more conveniently rotated when occupying positions on the highest shafts. Said sprockets are longitudinally spaced on their respective shafts and form sets of sprockets, each set comprising a sprocket on each shaft having a common plane substantially erect and transversely disposed to the normal direction of movement of the cultivator.

The endless tool mounting means 14, such as chains, are circumposed the sets of sprockets and engaged thereby. So positioned, the chains are free to travel in the frame, and because of the positioning of the sprockets theretofore described, the paths of travel of the chains are substantially congruent triangles having a sector downwardly disposed in spaced relation to the earth, a sector angled upwardly and laterally therefrom, and a hypotenuse sector closing the path of travel.

A drive linkage comprising a drive shaft 28 and a pair of universal joints 29 and 30 interconnect the power take-off 11 of the tractor and the drive shaft 28 journaled in the draft frame 13. Thus, it is clearly apparent that the harrow of the present invention may be drawn in earth traversing movement by the tractor 10, and the drive sprockets 27 rotated by rotation of the power take-off 11 and the tool mounting means circuitously traveled in the frame thereby.

Figure 6:
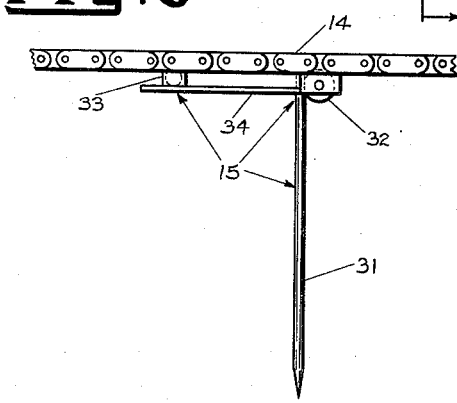
Fig. 6 is a fragmentary enlargement taken on line 6—6 of Fig. 5.

For convenience in illustration, the chains 14 are illustrated in Fig. 4 removed from the support frame 13 and disengaged from the sprockets 27 and 28, the paths of travel of the chains being thus clearly evident. Cultivator teeth 31 are preferably supported by the chains and motivated thereby. To this end, tool mounting elements 32 interconnect the chains in unitary relation, the teeth 31 being fixedly mounted thereon and outwardly extended from the chains. For convenience, the mounting elements and the cultivator teeth have been referred to as earth working tool assemblies 15. To maintain the teeth in operating position as they are drawn through the soil and to resist rearward drag thereof, as permitted by the flexible chains, tool positioning bars 33 interconnect the chains rearward of the mounting elements. Guide arms 34 are fixedly secured to the cultivator teeth, as by welding, and disposed for engagement with the positioning bars when the teeth tend to tip rearwardly. Referring to Fig. 6, it is clearly apparent that the cultivator teeth 31 may tip away from the positioning bars 33 but are precluded from tipping toward the same by the guide arms 34.

*Operation*

The operation of the present device is clearly apparent from the preceding description and is briefly summarized at this point. The implement is connected to the draw bar 12 of the tractor 10 and thereby is drawn over the soil. The drive linkage is connected between the power take-off 11 of the tractor and the shaft 25 mounting the drive sprockets 27 and serves to translate rotation of the take-off into rotation of said shaft. The telescopic association of the elements 19 and 20 is predetermined, achieving the desired attitude and elevation of the support frame 13 and earth working tools 15 traveled therein. It being generally preferable to have the teeth 31 engage the soil to a controlled extent at one side of the frame and progressively withdrawn from the soil as they traverse their paths of travel in the frame, the chains are traveled in a counterclockwise direction as seen in Fig. 3. Forward movement is imparted to the harrow and circuitous movement imparted to the chains and the earth working tool assemblies 15 borne thereby.

In a vineyard having had earth plowed from between the vines of the row, it is convenient to run one of the earth engaging members 16 down the plowed furrow, in which case the cultivator teeth engage the plowed soil, weeds and other debris, and as the teeth traverse the downwardly disposed flattened sector of their paths of travel, the teeth cultivate the soil, and in being gradually withdrawn therefrom, gradually release encountered debris and discharge the same near the point where they start upwardly around the sprockets of the shaft 24. During the earth engagement, the cooperation of the guide arms 34 with the following tool positioning bars 33 resists lagging or rearward dragging of the teeth. Inasmuch as said teeth may pivot away from the positioning bars, desired flexibility in the chain is achieved and there is no difficulty encountered in motivating the chain and teeth around the sprockets.

The harrow of the present invention is conveniently and accurately adjusted for controlled depth of soil engagement. The teeth 31 comb the debris from the soil and deposit it at a side of the harrow, where it may be conveniently handled by subsequent implements to destroy all weed fragments that might form rootings to continue the existence of the weeds. The motivation of the teeth is positive. The angular attitudes of the teeth as they start upwardly from their earth engaging sector is such as to release debris tending to become tangled therewith. The device is dependable in operation, economical to construct and productive of vineyard cultivating and cleaning results heretofore achieved only with great difficulty and expense.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. A power driven drag harrow adapted for use with a draft appliance having a power take-off, comprising a frame including a tool supporting section, an earth engaging means, and telescopic supports interconnecting the tool supporting section and the earth engaging means whereby the tool supporting section can be adjusted as to elevation from and inclination to earth traversed; a plurality of shafts journaled in the tool supporting section of the frame with their axes substantially parallel to the normal direction of movement of the harrow; sprockets mounted on the shafts in sets comprising sprockets arranged in common planes on the shafts; endless chains circumposing the sets of sprockets; elements interconnecting the chains in unitary relation and cultivator teeth mounted on the elements and extended therefrom for soil engagement.

2. In a harrow of the type described having a forwardly movable draft frame, endless chains; sprockets journaled in the frame and defining corresponding paths of travel for said chains in substantially erect, parallel planes transversely related to the normal direction of movement of the frame, each path having a flattened sector spacially related to earth traversed by the harrow and an adjoining sector angled upwardly and outwardly therefrom; elements interconnecting the chains in unitary relation; cultivator teeth mounted on said elements and operably extended therefrom; control bars interconnecting the chains in following relation to the teeth mounting elements; and control arms extended from the teeth and engageable with the control bars whereby the teeth are held forwardly, resistive to drag imposed thereon by the abutting of the control arms with their respective control bars while traversing the flattened sectors of the paths of travel of the chains.

3. A power driven harrow, for use with draft appliances having power take-offs, comprising a forwardly movable frame; adjustment means for laterally tilting the frame, a plurality of endless chains; sprockets journaled in the frame engaging the chains and defining substantially parallel, erect planes of travel for the chains transversely related to the normal directing of movement of the harrow and substantially congruent paths of travel in the planes, each path having a flattened sector spacially related to the ground over which the harrow is drawn; a drive linkage interconnecting the power take-off of the draft appliance and a sprocket of each chain whereby the chains are synchronously motivated in circuitous travel about the sprockets; tool mounting elements interconnecting the chains; tool positioning bars interconnecting the chains in following relation to the tool mounting elements; cultivator teeth borne by the mounting elements and extended therefrom for earth engagement, and guide arms fixedly attached to the cultivator teeth and engageable with the positioning bar, whereby the teeth are held in operable position in earth engagement while traversing the flattened sector by abutting of the guide arms and the positioning bars.

4. A power driven drag harrow adapted for use with a draft appliance having a power take-off, comprising a frame including a tool supporting section, an earth engaging means, and telescopic supports interconnecting the tool supporting section and the earth engaging means whereby the tool supporting section can be adjusted as to elevation from and inclination to earth traversed; a plurality of shafts journaled in the tool supporting section of the frame with their axes substantially parallel to the normal direction of movement of the harrow; sprockets mounted on the shafts in sets, each set comprising a sprocket on each shaft arranged in a common plane transversely of the shaft; endless chains individual to the sets of sprockets mounted in circumscribing relation to the sprockets of their respective sets: tool mounting elements interconnecting corresponding portions of the chains in unitary relation; teeth fixedly mounted on the tool mounting elements and outwardly extended from the chains; tool positioning members individual to the tool mounting members interconnecting corresponding portions of the chains in following substantially parallel relation to their respective tool mounting members; and guide arms rigidly extended from the tool mounting members for respective tool positioning member engagement.

ROBERT MAX PETTITT.

REFERENCES CITED

The following references are of record in the file of this patent:

UNITED STATES PATENTS

| Number | Name | Date |
|---|---|---|
| 781,955 | Kingston | Feb. 7, 1905 |
| 942,294 | Speer | Dec. 7, 1909 |
| 1,038,858 | Darby | Sept. 17, 1912 |
| 1,048,808 | Bushong | Dec. 31, 1912 |
| 1,241,070 | Williamson | Sept. 25, 1917 |
| 1,331,340 | Gordon | Feb. 17, 1920 |
| 1,335,052 | Gordon | Mar. 30, 1920 |

FOREIGN PATENTS

| Number | Country | Date |
|---|---|---|
| 29,495 of 1906 | Great Britain | 1906 |
| 34,551 | Sweden | Apr. 2, 1913 |